(12) United States Patent
Smith et al.

(10) Patent No.: US 10,177,822 B2
(45) Date of Patent: Jan. 8, 2019

(54) NODE SYNCHRONIZATION USING TIME REVERSAL

(71) Applicant: Ziva Corporation, San Diego, CA (US)

(72) Inventors: David Smith, Ellicott City, MD (US); Jeremy Rode, San Diego, CA (US); Mark Hsu, La Jolla, CA (US); Anis Husain, San Diego, CA (US); Kris Gregorian, Encinitas, CA (US); Jeremy Ward, San Diego, CA (US)

(73) Assignee: ZIVA CORP., San Diego, CA (US)

( * ) Notice: Subject to any disclaimer, the term of this patent is extended or adjusted under 35 U.S.C. 154(b) by 81 days.

(21) Appl. No.: 15/583,896

(22) Filed: May 1, 2017

(65) Prior Publication Data

US 2017/0302339 A1    Oct. 19, 2017

Related U.S. Application Data

(63) Continuation-in-part of application No. 14/494,580, filed on Sep. 23, 2014, now Pat. No. 1,021,659, and a continuation-in-part of application No. 14/476,738, filed on Sep. 4, 2014, now Pat. No. 9,794,903.

(60) Provisional application No. 61/881,393, filed on Sep. 23, 2013.

(51) Int. Cl.
*H04W 56/00* (2009.01)
*H04W 84/18* (2009.01)
*H04B 7/024* (2017.01)

(52) U.S. Cl.
CPC ........ *H04B 7/024* (2013.01); *H04W 56/0015* (2013.01); *H04W 56/0025* (2013.01); *H04W 84/18* (2013.01)

(58) Field of Classification Search
CPC .............. H04B 7/024; H04B 10/25755; H04B 10/25758; H04W 56/0015; H04W 56/0025; H04W 84/18; H04W 36/14; H04W 88/085
See application file for complete search history.

(56) References Cited

U.S. PATENT DOCUMENTS

2004/0096222 A1* 5/2004 Cagenius ......... H04B 10/25755
398/115
2006/0117113 A1* 6/2006 Elliott ....................... H04L 1/22
709/239

(Continued)

*Primary Examiner* — Awet Haile
(74) *Attorney, Agent, or Firm* — Anatoly S. Weiser, Esq.

(57) ABSTRACT

In examples, Radio Frequency nodes of an array are synchronized using Time-Reversal. A Master node ("Master") of the array receives and captures a sounding signal emitted by a Slave node ("Slave") of the array, downconverts it to baseband, Time-Reverses the downconverted signal, upconverts the Time-Reversed signal to the carrier frequency using the Master's clock so that the upconverted signal has phase property of the Master's clock, and transmits the resulting signal to the Slave. The Slave receives the signal from the Master, and adjusts the phase of the Slave's clock so that the phases of the two nodes are aligned. Once phases, frequencies, and time references of the array's nodes are aligned, the array may be used for coherent operation. In examples, the array is used to transmit Time-Reversed signals so that the signals from the array's nodes are spatially and temporally focused on a target.

20 Claims, 4 Drawing Sheets

(56) References Cited

U.S. PATENT DOCUMENTS

| | | | |
|---|---|---|---|
| 2010/0157975 A1* | 6/2010 | In | H04J 3/0682 |
| | | | 370/350 |
| 2012/0098697 A1* | 4/2012 | Paek | G01S 13/003 |
| | | | 342/174 |
| 2013/0034358 A1* | 2/2013 | Sung | H04W 88/085 |
| | | | 398/115 |
| 2013/0122917 A1* | 5/2013 | Yavuz | H04J 3/0638 |
| | | | 455/450 |
| 2015/0103784 A1* | 4/2015 | Lorca Hernando | H04L 5/0032 |
| | | | 370/329 |

* cited by examiner

NODE SYNCHRONIZATION USING TIME REVERSAL

CROSS-REFERENCE TO RELATED APPLICATIONS

The present application is a continuation-in-part of and claims priority from U.S. patent application Ser. No. 14/476,738, entitled SYNCHRONIZATION OF DISTRIBUTED NODES, filed on Sep. 4, 2014; which claims priority from U.S. Provisional Patent Application Ser. No. 61/881,393, entitled APPARATUS, METHODS, AND ARTICLES OF MANUFACTURE FOR COLLABORATIVE ARRAY COMMUNICATIONS INCLUDING BEAMFOCUSING OF EMISSIONS, filed on 23 Sep. 2013. The present application is also a continuation-in-part of and claims priority from U.S. patent application Ser. No. 14/494,580, entitled SYNCHRONIZATION OF DISTRIBUTED NODES IN WIRELESS SYSTEMS, filed on Sep. 23, 2014; which also claims priority from U.S. Provisional Patent Application Ser. No. 61/881,393, entitled APPARATUS, METHODS, AND ARTICLES OF MANUFACTURE FOR COLLABORATIVE ARRAY COMMUNICATIONS INCLUDING BEAMFOCUSING OF EMISSIONS, filed on 23 Sep. 2013. Each of the above-referenced patent documents is assigned to the assignee of the present application and is incorporated herein by reference in its entirety, including text, figures, claims, tables, and computer program listing appendix (if present).

FIELD OF THE INVENTION

This document relates generally to the field of wireless communications and other wireless transmissions. In particular, this document relates to operation of collaborative untethered radio frequency (RF) communication nodes of an array.

BACKGROUND

Distributed coherent communications are Radio Frequency (RF) communications where coherent transmissions are made from a transmit antenna array, and/or RF transmissions are received by a synchronized receive antenna array. Each of the antenna arrays may be formed by an array of nodes, with each of the nodes having one or more of the antennas. Some or all of the nodes of either transmit (Tx) node array or receive (Rx) node array may be ad hoc nodes (as is described below). The "coherent" property of the coherent communications refers to synchronization of the nodes, so that (1) each of the nodes in the transmit array can transmit synchronously, and/or (2) each of the nodes of the receive array are synchronized and the received signals may be combined using a common time reference, with resulting transmit and/or receive array gain. Distributed coherent communications may offer significant link budget gains and increased performance over those available with single-antenna-to-single-antenna communications. Compared to the use of single antenna transceivers, the use of multiple antennas in wireless networks may offer the promise of increased data rates, reach distance, battery life, anti jam capabilities, spectral reuse, reduced latency, and/or other benefits. Distributed coherence can be leveraged into transmit beamforming (with, e.g., $N^2$-fold increase in power for N transmit antennas), receive beamforming.

Synchronization of the different nodes that are ad hoc nodes (as this is explained below, in the related applications, and in other commonly-assigned applications incorporated by reference below) is not always a trivial manner. This may be especially problematic when the one or more channels between a Master node of the array (to which other nodes of the array are synchronized) experience substantial multipath or are Non-Line-of-Sight (NLoS) channels. Additionally, in the initial alignment process, the clocks of the Slave nodes (nodes of the array other than the Master node) may not be time-synchronized to the Master node, and hence the Master node's calculation of the round-trip delay times may be in error to an arbitrary degree, compared to what the Master node could have calculated with proper time synchronization.

Synchronization (alignment of phases, frequencies, and time bases of the nodes of an array) is necessary for the array to operate as a phased array or a Time-Reversal mirror that can focus transmissions on one or more targets, while possibly nulling (reducing) the energy transmitted to other points, such as at hostile receivers. Therefore, there is a need in the art for techniques for improving radio frequency communications, and in particular for techniques for synchronizing arrays of ad hoc nodes. In particular, there is a need for improved techniques for synchronizing ad hoc nodes in both static and dynamically-changing environments, and where the nodes are located Line-of-Sight (LoS) and/or Non-Line-of-Sight of other nodes of the array. Additionally, there is a need in the art for improved array synchronization techniques for arrays that transmit targeted destructive electromagnetic pulses ("EMPs").

SUMMARY

Embodiments, variants, and examples described in this document are directed to methods, apparatus, and articles of manufacture that may satisfy one or more of the above described needs and/or other needs.

In an embodiment, a method of aligning clock reference phase of a first radio frequency (RF) node with clock reference phase of a second RF node includes: emitting an RF sounding signal by the first RF node; capturing signal resulting from the step of emitting the RF sounding signal at the second RF node, thereby obtaining captured signal at the second node; downconverting the captured signal to baseband, thereby obtaining baseband sounding signal at the second RF node; time-reversing the baseband sounding signal, thereby obtaining a TR baseband signal at the second RF node; upconverting the TR baseband signal to carrier frequency using the clock reference phase of the second RF node, thereby obtaining transmit signal at the second RF node; transmitting the transmit signal by the second RF node; receiving the transmit signal by the first RF node; determining difference between the clock reference phase of the first RF node and the clock reference phase of the second RF node, by the first RF node; and adjusting the clock reference phase of the first RF node to reduce the difference.

In an embodiment, an apparatus includes a first Radio Frequency (RF) node and a second RF node. The first RF node and the second RF node are configured to perform the following steps: emitting an RF sounding signal by the first RF node; capturing signal resulting from the step of emitting the RF sounding signal at the second RF node, thereby obtaining captured signal at the second node; downconverting the captured signal to baseband, thereby obtaining baseband sounding signal at the second RF node; time-reversing the baseband sounding signal, thereby obtaining a TR baseband signal at the second RF node; upconverting the TR baseband signal to carrier frequency using clock reference phase of the second RF node, thereby obtaining transmit signal at the second RF node; transmitting the transmit signal by the second RF node; receiving the transmit signal by the first RF node; determining difference between clock reference phase of the first RF node and the clock reference phase of the second RF node, by the first RF node; and adjusting the clock reference phase of the first RF node to reduce the difference.

In an embodiment, a method of operating radio frequency nodes includes emitting a first RF sounding signal by a first RF node; capturing a first received sounding signal resulting from the step of emitting the first RF sounding signal by the first RF node, the step of capturing the first received sounding signal being performed at a second RF node; downconverting the first received sounding signal to baseband or to Intermediate Frequency (IF) to obtain a first lower frequency sounding signal; time-reversing the first lower frequency sounding signal to obtain a first TR lower frequency signal; upconverting the first TR lower frequency signal to carrier frequency using clock reference of the second RF node to obtain a first transmit signal; transmitting the first transmit signal by the second RF node; receiving a first return signal resulting from the step of transmitting the first transmit signal, by the first RF node; determining difference between phase of clock reference of the first RF node and phase of clock reference of the second RF node, the step of determining being based on the first return signal; and adjusting the phase of the clock reference of the first RF node to reduce the difference between the phase of the clock reference of the first RF node and the phase of the clock reference of the second RF node.

In aspects, the first RF node and the second RF node are Non-Line-of-Sight (NLoS) to each other.

In aspects, the steps of emitting, capturing, downconverting, time-reversing, upconverting, transmitting, receiving, determining, and adjusting are repeated until the phase of the clock reference phase of the first RF node differs from the phase of the clock reference of the second RF node by no more than a predetermined phase difference limit.

In aspects, the step of downconverting the first received sounding signal includes downconverting the first received sounding signal to IF.

In aspects, the step of downconverting the first received sounding signal includes downconverting the first received sounding signal to baseband.

In aspects, the method further includes emitting a third RF sounding signal by a third RF node; capturing a third received sounding signal resulting from the step of emitting the third RF sounding signal by the third RF node, the step of capturing the third received sounding signal being performed at the second RF node; downconverting the third received sounding signal to baseband or to IF (which may be the same or substantially the same as the IF used in the case of the first received sounding signal, or a different IF) to obtain a third lower frequency sounding signal; time-reversing the third lower frequency sounding signal to obtain a third TR lower frequency signal; upconverting the third TR lower frequency signal to carrier frequency (which may be the same or substantially the same as the carrier frequency used for upconverting the first TR lower frequency signal, or a different carrier frequency) using clock reference of the second RF node to obtain a third transmit signal; transmitting the third transmit signal by the second RF node; receiving a third return signal resulting from the step of transmitting the third transmit signal, by the third RF node; determining difference between phase of clock reference of the third RF node and the phase of the clock reference of the second RF node, the step of determining being based on the third return signal; and adjusting the phase of the clock reference of the third RF node to reduce the difference between the phase of the clock reference of the third RF node and the phase of the clock reference of the second RF node.

In aspects, the first RF node, the second RF node, and the third RF node are ad hoc nodes.

In aspects, the method further includes aligning frequencies and time references of the first RF node, the second RF node, and the third RF node; and operating the first RF node, the second RF node, and the third RF node as a Time-Reversal mirror focused on one or more external targets.

In aspects, the method further includes aligning frequencies and time references of the first RF node, the second RF node, and the third RF node; and operating the first RF node, the second RF node, and the third RF node as a phased array directed towards an external target.

In aspects, the method further includes aligning frequencies and time references of the first RF node, the second RF node, and the third RF node; and step for operating the first RF node, the second RF node, and the third RF node as a Time-Reversal mirror focused on a target.

In aspects, the steps of aligning, adjusting the clock reference phase of the first RF node, and adjusting the clock reference phase of the third RF node are performed before the first RF node, the second RF node, and the third RF node receive a sounding signal from the target, whereby the first RF node, the second RF node, and the third RF node are pre-aligned and ready to operate in a collaborative manner to focus on the target.

In an embodiment, a method of operating an array of radio frequency includes step for aligning phases of clock references of the RF nodes of the array; aligning frequencies of the clock references of the RF nodes of the array; aligning time references of the RF nodes of the array; and step for operating the RF nodes of the array as a Time-Reversal mirror focused on a target.

In an embodiment, a system includes a first Radio Frequency (RF) node having a first RF receiver, a first RF transmitter, a first clock reference, and a first processing element, wherein the first processing element is coupled to the first RF receiver, the first RF transmitter, and the first clock reference to control operation of the first RF receiver, the first RF transmitter, and the first clock reference. The system also includes a second RF node having a second RF receiver, a second RF transmitter, a second clock reference, and a second processing element, wherein the second processing element is coupled to the second RF receiver, the second RF transmitter, and the second clock reference to control operation of the second RF receiver, the second RF transmitter, and the second clock reference. The first processing element and the second processing element are configured to cause the first RF node and the second RF node to: emit a first RF sounding signal by the first RF node; capture by second RF node a first received sounding signal resulting from emission of the first RF sounding signal by the first RF node; downconvert by the second RF node the first received sounding signal to baseband or to Intermediate Frequency (IF) to obtain a first lower frequency sounding signal; time-reverse by the second RF node the first lower frequency sounding signal to obtain a first TR lower frequency signal; upconvert by the second RF node the first TR lower frequency signal to carrier frequency using clock reference of the second RF node to obtain a first transmit signal; transmit the first transmit signal by the second RF node; receive by the first RF node a first return signal resulting from transmission of the first transmit signal; determine by the first RF node difference between phase of the first clock reference and phase of the second clock reference, based on the first return signal; and adjust the phase of the first clock reference to reduce the difference between the phase of the first clock reference and the phase of the second clock reference.

In aspects, the first RF node and the second RF node are Non-Line-of-Sight (NLoS) to each other.

In aspects, the second processing element is further configured to cause the second RF node to downconvert the first received sounding signal to IF.

In aspects, the second processing element is further configured to cause the second RF node to downconvert the first received sounding signal to baseband.

In aspects, the system further includes a third RF node having a third RF receiver, a third RF transmitter, a third clock reference, and a third processing element, wherein the third processing element is coupled to the third RF receiver, the third RF transmitter, and the third clock reference to control operation of the third RF receiver, the third RF transmitter, and the third clock reference. The third processing element and the second processing element are configured to cause the third RF node and the second RF node to emit a third RF sounding signal by the third RF node; capture by the second RF node a third received sounding signal resulting from emission of the third RF sounding signal by the third RF node; downconvert by the second RF node the third received sounding signal to baseband or to Intermediate Frequency (IF) to obtain a third lower frequency sounding signal; time-reverse by the second RF node the third lower frequency sounding signal to obtain a third TR lower frequency signal; upconvert by the second RF node the third TR lower frequency signal to carrier frequency using the second clock reference to obtain a third transmit signal; transmit the third transmit signal by the second RF node; receive by the third RF node a third return signal resulting from transmission of the third transmit signal; determine by the third RF node difference between phase of the third clock reference and the phase of the second clock reference, based on the third return signal; and adjust the phase of the third clock reference to reduce the difference between the phase of the third clock reference and the phase of the second clock reference.

In aspects, the first RF node, the second RF node, and the third RF node are ad hoc nodes.

In aspects, the first processing element, the second processing element, and the third processing element are further configured to cause the first RF node, the second RF node, and the third RF node to align frequencies of the first clock reference, the second clock reference, and the third clock reference; align time references of the first RF node, the second RF node, and the third RF node; and operate the first RF node, the second RF node, and the third RF node as a Time-Reversal mirror focused on one or more external targets.

In aspects, the first processing element, the second processing element, and the third processing element are further configured to cause the first RF node, the second RF node, and the third RF node to align frequencies of the first clock reference, the second clock reference, and the third clock reference; align time references of the first RF node, the second RF node, and the third RF node; and operate the first RF node, the second RF node, and the third RF node as a phased array directed towards an external target.

These and other features and aspects of selected embodiments, variants, and examples consistent with the present invention(s) will be better understood with reference to the following description, drawings, and appended claims.

DETAILED DESCRIPTION

Figure 1:
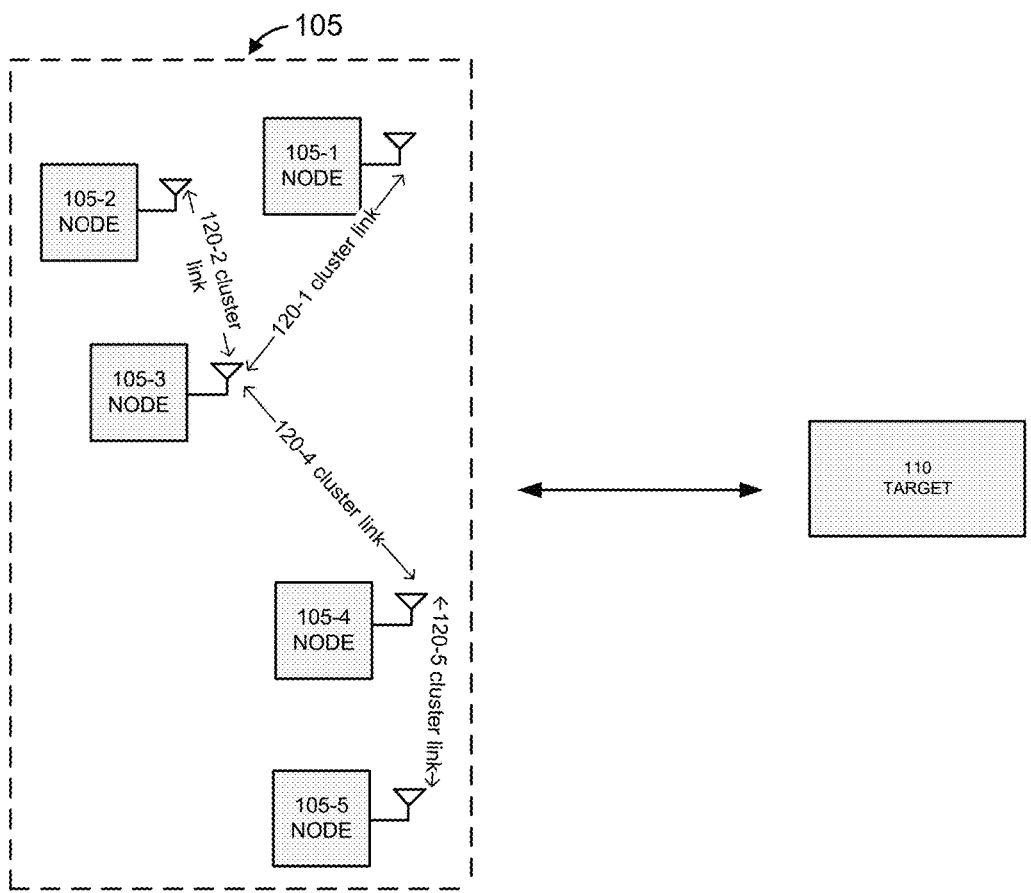
FIG. 1 illustrates selected nodes and links of an array configured in accordance with one or more features described in this document, and a target of the array's transmissions.

The words "embodiment," "variant," "example," and similar words and expressions as used here refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and phrases are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is a preferred one; the embodiment, variant, or example may but need not be a currently preferred embodiment, variant, or example. All embodiments, variants, and examples are described for illustration purposes and are not necessarily strictly limiting.

The words "couple," "connect," and similar words with their inflectional morphemes, as well as similar words and phrases, do not necessarily import an immediate or direct connection, but include within their meaning connections through mediate elements.

The expression "processing logic" should be understood as selected steps/decision blocks and/or hardware/software/firmware for implementing the selected steps/decision blocks. "Decision block" means a step in which a decision is made based on some condition, and process flow may be altered based on whether the condition is met or not met.

The expression ad hoc in reference to nodes of an array of nodes is used to signify that at least some (or all) of the ad hoc nodes have their own physical clocks, and the nodes are "untethered" in the sense that they are (1) free to move, in absolute terms (e.g., with respect to a point with fixed coordinates, including scatterers, targets, and nodes of another array), and to move with respect to each other; and/or (2) free to rotate around one or more axes. Some constraints on the movements of some or all of the nodes need not necessarily vitiate their untethered or ad hoc character; for example, nodes that are free to move in only one or two dimensions (and not all three dimensions) may still be ad hoc nodes, whether or not they rotate around any axis. Examples of such nodes may include radios carried by a squad of soldiers; radios onboard different aircrafts, water vessels or buoys, land vehicles, satellites; and similar nodes.

The nodes may be ad hoc even if they are not used in TR-communications; for example, nodes of a phased-array that is beamforming in a selected direction (rather than beamforming on a selected spot/item or spot-focusing, as is typically the case with TR communications) may also be ad hoc nodes.

The abbreviation "TR" stands for Time-Reverse and various inflectional morphemes and forms of this expression, whether hyphenated or not and whether capitalized or not, such as Time-Reversal, Time-Reversing, Time-Reversed, time reverse, time reversal, time reversing, time-reversed, Time Reverse, Time Reversal, Time Reversing, Time Reversed, time-reverse, time-reversal, time-reversing, time-reversed.

Some definitions have been explicitly provided above. Other and further explicit and implicit definitions and clarifications of definitions may be found throughout this document.

FIG. 1 illustrates in a high level, block-diagram manner, selected components of an array 105 that communicates with a target 110. The array 105 includes ad hoc nodes 105-N that may communicate with each other, and synchronize their respective clocks (i.e., aligning time, phase, and frequency). As shown, the array 105 includes five distributed cooperating nodes, 105-1 through 105-5. In similar examples, the array 105 may include any number of a plurality of nodes 105-N, for example, 2, 3, 4, 5, 6, 7, 8, 9, 10, or more.

The nodes 105-N may be within LoS or NLoS of each other, and may communicate directly with each other via side channel links 120. As shown, the links 120-1, 120-2, and 120-4 connect the node 105-3 to each of the nodes 105-1, 105-2, and 105-4, respectively; and the link 120-5 connects the node 105-4 to the node 105-5. The node 105-3 may thus communicate directly with each of the nodes 105-1, 105-2, and 105-4. The node 105-3 may communicate with the node 105-5 indirectly, through the node 105-4 and the links 120-4 and 120-5. This is just one example. More generally, any of the nodes 105-N may be connected by such side channel link 120 to any of the other nodes 105-N, and any of the nodes 105-N may lack a direct link to any other node (or nodes) 105-N, and communicate with such other nodes 105-N through intermediate nodes and multiple (two or more) links. The side channel links 120 may be implemented, for example, using short-range radio frequency (RF) link such as a Bluetooth® link, WiFi, or other short-, medium-, and longer-range RF technologies.

The inter-node distance of the array 105 may be much smaller (by a factor of at least 10, at least 100, at least 1000, or even greater) than the array distances between any of the nodes 105-N and the target 110. For example, each of the distances between any two nodes 105-N may be less than $\frac{1}{10}$, less than $\frac{1}{100}$, or less than $\frac{1}{1000}$ than any of the distances between any selected node 105-N and the target 110. In examples, however, the inter-node distances of the array 105 are not much smaller (as "much smaller" is explained at the beginning of this paragraph) than the distance between (1) one or more nodes 105-N and (2) the target 110.

Figure 2:
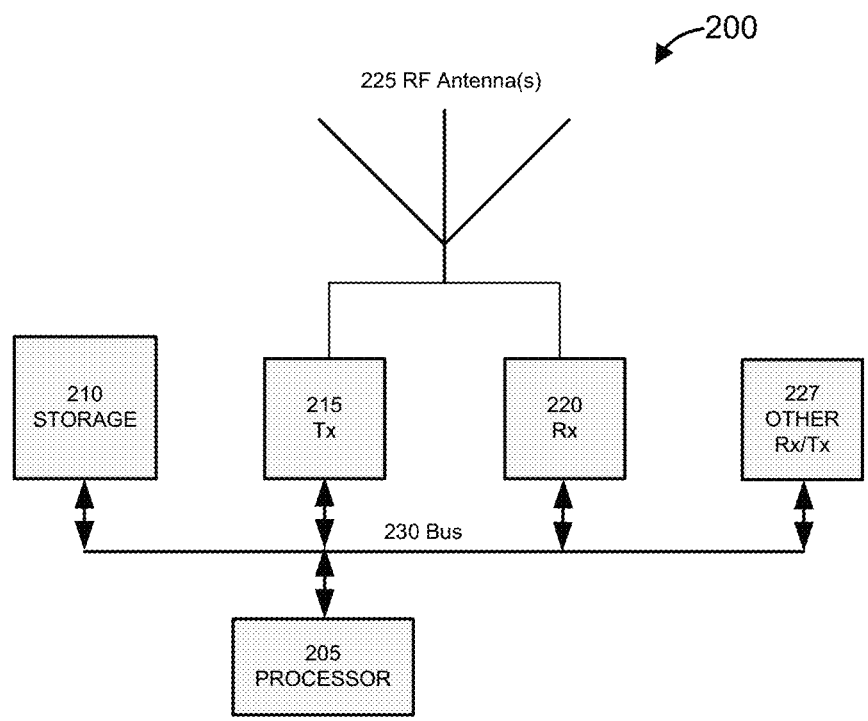
FIG. 2 illustrates selected elements of a node of an array configured in accordance with one or more features described in this document.

FIG. 2 illustrates selected elements of an apparatus 200 configured in accordance with one or more features described in this document. The apparatus 200 may be any of the cooperative nodes of the array 105 and the target 110. The apparatus may include processor(s) 205; storage device (s) 210 (which may store program code for execution by the processor 205); an RF receiver 220 configured to receive radio frequency signals, such as sounding signals and their reflections/backscatter, information from other nodes of the same array, from the target 110, and from other sources; an RF transmitter 215 configured to transmit radio frequency signals, such as sounding signals, collaborative communications to the target or to other devices such as nodes of other arrays, and information for other nodes of the same array; one or more RF transmit and receive antennas 225 coupled to the receiver 220 and the transmitter 215; and a non-RF processing module 227, such as an optical or acoustic transceiver and associated signal processing devices. A bus 230 couples the processor 205 to the storage device 210, to the receiver 220, to the transmitter 215, and to the non-RF processing module 227. The bus 230 allows the processor 205 to read from and write to these devices, and otherwise to control operation of these devices. In embodiments, additional receivers and/or transmitters are present and coupled to the processor 205.

In examples, the array 105 and the target 110 communicate in whole or in part using Time-Reversal techniques. Time Reversal techniques may combine (1) sounding of a channel with (2) applying pre-filtering to a transmission, e.g., time-reversing the channel impulse response (the channel response from one object to another) and convolving it with data to be sent or with some other signal such as a pulse/burst or another waveform (which may be a well-autocorrelated waveform). "Sounding" and its inflectional morphemes refer to transmitting a signal for the purpose of obtaining information about the channels, for example, for forming TR signals. Sounding may also be opportunistic, that is, the sounding signal may be transmitted for another purpose but also used for obtaining the channel state information. The sounding signal may be a sharp pulse approaching an impulse, a Gaussian burst, or another appropriate burst with substantially flat frequency response in the communication band, and having a good autocorrelation function (i.e., approaching that of an impulse function), as is known in communication theory and related fields (e.g., CDMA, autocorrelation radar).

In examples, the nodes 105-N of the array 105 align with each other using Time-Reversal techniques, in a way that is discussed in detail in this document. Time-Reversal techniques used for array alignment differs from Time-Reversal used for spatial and temporal collaborative focusing, as a person skilled in the art will recognize after careful perusal of this document.

Time-reversal techniques (for communication and other purposes) and sounding are described in several commonly-owned and related patent documents, including the following:

1. U.S. patent application Ser. No. 13/462,514, U.S. Patent Application Publication Number 2012/0328037, entitled ANTI-GEOLOCATION, filed on 2 May 2012, now U.S. Pat. No. 9,201,132, issued on 1 Dec. 2015;

2. International Patent Publication WO/2012/151316 (PCT/US2012/36180), entitled DISTRIBUTED CO-OPERATING NODES USING TIME REVERSAL, filed 2 May 2012;

3. U.S. patent application Ser. No. 14/114,901, U.S. Publication Number 2014/0126567, entitled DISTRIBUTED CO-OPERATING NODES USING TIME REVERSAL, filed on 30 Oct. 2013, now U.S. Pat. No. 9,497,722, issued on 15 Nov. 2016;

4. U.S. Provisional Patent Application Ser. No. 61/481, 720, entitled DISTRIBUTED CO-OPERATING NODES USING TIME REVERSAL FOR COMMUNICATIONS, SENSING & IMAGING, filed on 2 May 2011;

5. U.S. Provisional Patent Application Ser. No. 61/540, 307, entitled DISTRIBUTED CO-OPERATING NODES USING TIME REVERSAL FOR COMMUNICATIONS, SENSING & IMAGING, filed on 28 Sep. 2011;

6. U.S. Provisional Patent Application Ser. No. 61/809,370, entitled APPARATUS, METHODS, AND ARTICLES OF MANUFACTURE FOR COLLABORATIVE BEAM-FOCUSING OF RADIO FREQUENCY EMISSIONS, filed on 7 Apr. 2013;

7. U.S. Provisional Patent Application Ser. No. 61/829,208, entitled APPARATUS, METHODS, AND ARTICLES OF MANUFACTURE FOR COLLABORATIVE BEAM-FOCUSING OF RADIO FREQUENCY EMISSIONS, filed on 30 May 2013;

8. International Patent Publication WO/2014/168892 (PCT/US2014/033234), entitled DISTRIBUTED CO-OPERATING NODES USING TIME REVERSAL, filed 7 Apr. 2014;

9. U.S. patent application Ser. No. 14/247,229, U.S. Patent Application Publication Number 2014/0301494, entitled DISTRIBUTED CO-OPERATING NODES USING TIME REVERSAL, filed on 7 Apr. 2014, now U.S. Pat. No. 9,548,799;

10. U.S. Provisional Patent Application Ser. No. 61/881,393, entitled APPARATUS, METHODS, AND ARTICLES OF MANUFACTURE FOR COLLABORATIVE ARRAY COMMUNICATIONS INCLUDING BEAMFOCUSING OF EMISSIONS, filed on 23 Sep. 2013;

11. U.S. patent application Ser. No. 14/476,738, U.S. Patent Application Publication Number 2015/0085853, entitled SYNCHRONIZATION OF DISTRIBUTED NODES, filed on 4 Sep. 2014;

12. U.S. patent application Ser. No. 14/494,580, U.S Patent Application Publication Number 2015/0173034, entitled SYNCHRONIZATION OF DISTRIBUTED NODES, filed 23 Sep. 2014;

13. U.S. Provisional Patent Application Ser. No. 62/126,437, entitled TIME REVERSAL IN WIRELESS COMMUNICATIONS, filed on 27 Feb. 2015;

14. International Patent Publication WO/2016/137898 (PCT/US2016/018968), entitled TIME REVERSAL IN WIRELESS COMMUNICATIONS (OFDM), filed 22 Feb. 2016;

15. U.S. Provisional Patent Application Ser. No. 62/196,885, entitled TIME REVERSAL IN WIRELESS COMMUNICATIONS, filed on 24 Jul. 2015;

16. U.S. patent application Ser. No. 15/217,944, U.S. Patent Application Publication Number 2017/0026147, entitled WIRELESS SENSING WITH TIME REVERSAL, filed 22 Jul. 2016; and 17. U.S. patent application Ser. No. 15/277,934, U.S. Patent Application Publication Number 20170093475, entitled ARRAY-TO-ARRAY BEAMFORMING AND ITERATIVE TIME REVERSAL TECHNIQUES, filed 27 Sep. 2016.

Each of the patent documents described above is hereby incorporated by reference, including specification, claims, figures, tables, and all other matter in the patent document. We may refer collectively to these documents and other commonly-owned patent documents specifically identified throughout the present document as "incorporated applications," "incorporated patent documents," "related patent documents," and similar expressions.

The nodes 105-N can communicate locally (with other nodes of the same array 105), for example, for data distribution, synchronization, coordination, and/or other purposes. The nodes of the array 105 may be ad hoc nodes with separate individual clock references; the nodes may be tethered with a common clock reference; or the array 105 may have a combination of both types of nodes, ad hoc and tethered (not ad hoc) nodes. Thus, in the array 105, a common time base is established with a common reference mirror and emission time set for all nodes of the array 105. (Nodes that are not so synchronized, whether because of design intent/defect or inability due to temporary circumstances of the array's operation, are not considered part of the array 105 for present purposes.) The reference mirror and emission times may be used for various purposes, such as collaborative channel sounding, beamforming, and retrodirection.

The ad hoc (and other) node synchronization may also be performed using Time-Reversal techniques; thus, Time-Reversal may be used here for synchronization of the nodes of the array 105, and also for communicating with the target 110, which is not part of the array 105, i.e., the target 110 is "external" to the array 105. Using Time-Reversal for array synchronization may permit, in examples, the array to be internally synchronized in a manner that does not require the array to see a signal from an external target and then synchronize the array so that it locks onto the target. Rather, the array may be pre-aligning, enabling coherent focusing onto the target to be a separate process. The array (or any of its constituent nodes) can move while fully internally synchronized, ready to capture a signal from the target and promptly operate in a synchronized collaborative manner, focusing energy onto the target. The array need not necessarily operate in a conventional closed-loop manner where it is not synchronized until the array possesses information regarding the specific distances from each of the array's nodes to the target.

Figure 3:
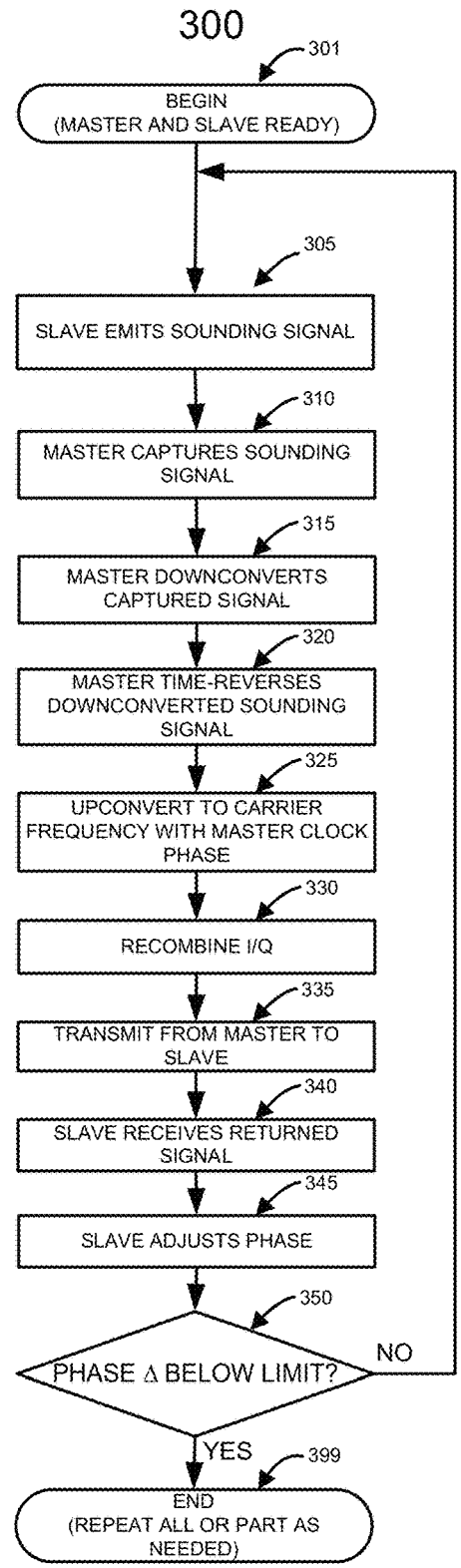
FIG. 3 illustrates selected steps/block(s) of an exemplary process for aligning phases of the array's nodes.

FIG. 3 illustrates selected steps of an exemplary process 300 for internal array node synchronization between one of the Slave nodes (e.g., node 105-1) and the Master node (e.g., node 105-3). At a flow point 301 the two nodes are powered and ready.

In step 305, the Slave node emits a sounding signal with a substantially finite envelope at a carrier frequency derived from the clock of the Slave node. Recall that sounding signals are explained above.

In step 310, the Master node captures this signal, e.g., all or substantially all of the envelope including multipath components resulting from the sounding at the Master node.

In step 315, the Master node mixes the captured sounding signal down to a baseband frequency or to an intermediate frequency ("IF") using the clock of the Master node with its embedded properties. In mixing the captured signal, the captured signal may be split into I/Q sub-signals.

In step 320, the Master node Time-Reverses the baseband (or IF) I/Q signals around a symmetry time defined as t=T, which is some arbitrary time after the sounding signal is received at the Master node.

In step 325, the captured and Time-Reversed I/Q signals are mixed back up to the carrier frequency using the clock of the Master node. The clock of the Master node is not phase conjugated when the signal is thus upconverted back to the carrier frequency. In general, if a signal is Time-Reversed, the process time-reverses the signal envelope properties at baseband and phase conjugates the carrier. If the Time-Reversal is applied to the I/Q components at baseband (or IF), the carrier has been removed and hence will not be automatically phase conjugated by the Time-Reversal process.

In step 330, the upconverted I/Q signals are recombined into a single signal.

In step 335, the recombined signal is transmitted back to the Slave node.

In step 340, the Slave node receives and captures the signal transmitted by the Master node. We may refer to this received signal the "returned signal." Because the returned signal carries the phase property of the clock of the Master node, the Slave node can determine the phase difference between its own clock and the clock of the Master node. For example, the Slave node may mix the returned signal with its own carrier signal (which includes the phase property of the Slave node's clock).

In step 345, the Slave node adjusts the phase of its clock to drive the phase difference to zero. The preceding steps may be repeated as needed, for example, until the phase difference is below a predetermined limit. As shown in FIG. 3, decision block 350 may perform this test and, depending on the result, route process flow back to step 305 or to flow point 399 where the process 300 may terminate.

The process 300 may be repeated between the Slave node 105-1 and the Master node 105-3 as needed, for example, periodically, at predetermined times, and/or based on some metric that reflects the performance of the array.

In embodiments, array node synchronization using Time-Reversal has a number of benefits. One potential benefit is automatic elimination of the phase difference resulting from the propagation delay between the Master node and the Slave node. Therefore, the Slave node may no longer need to calculate and remove the effect of the propagation delay.

Another potential benefit is that Time-Reversal continues to eliminate or reduce the effect of multipath propagation. As an aside, we may enquire whether all the phases of the multipath signal components will be properly aligned. After all, if the phases of the array nodes are not equalized correctly, they may not align at the target (which in the node-to-node synchronization process is one of the nodes). If the multipath scatterers are viewed as different nodes in a different scattering array, do they not have to be phase-corrected independently? In fact, although the different multipath scatterers act to some extent like different sources, since they are all illuminated by the same Slave node or Master node, even though the return signal is not phase conjugated, the different multipath signals all have the same phase and do not produce random fading at the signal peak. The random fading mentioned above may occur when the there are multiple independent sources. Multipath scatterers are not independent sources. They simply behave like extended copies of a single source. The Time-Reversal eliminates the effects of the different propagation delays without fading. Such is our current understanding.

Still another potential benefit is that the Time-Reversal based synchronization process works well not only when the two nodes being synchronized are LoS to each other, but also when the nodes are NLoS to each other. Efficient operation may thus be enhanced in many environments.

In operation, multiple processes 300 may be performed between several or all the Slave nodes of the array and the Master node. The multiple processes 300 may be performed in parallel, sequentially, in a staggered/pipelined manner, and/or otherwise. With sufficient resources, the array may be synchronized within a time interval not much longer than it takes to synchronize a single Slave node to its Master node.

The process 300 may be performed after the frequency of the Slave node's clock reference is aligned to the frequency of the Master node. The process 300 may also be used to align the frequency of the Slave node's clock reference to the frequency of the Master node's clock reference by measuring the drift of the relative phases over time. In embodiments, the frequency and phase are synchronized in a single step, using two or more executions of the process 300.

Once the array 105 is synchronized (including phase alignment as is described above, frequency alignment, and time alignment), it may be used to transmit using TR to the target 110, to transmit using TR to multiple targets, to transmit using TR to one or multiple targets while nulling (reducing) the signal at predetermined points such as those corresponding to hostile receivers, or to transmit a directionally beamformed signal as a phased array. The transmission may be, for example, an information-carrying signal, or a destructive/interfering EMP. The synchronized array may also be used for other purposes, including those mentioned in all of the patent documents incorporated by reference in this document.

Figure 4:
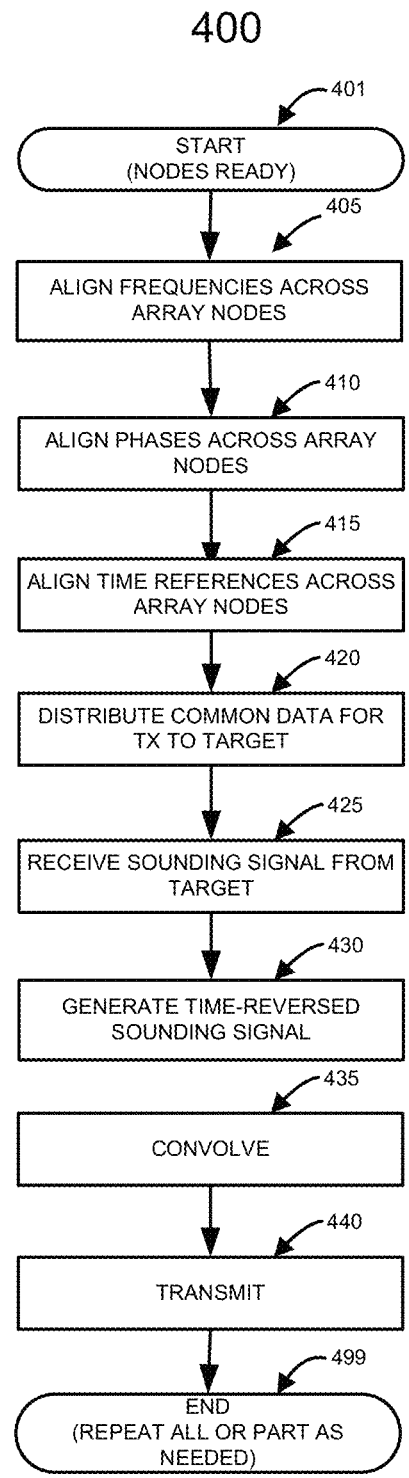
FIG. 4 illustrates selected steps of an exemplary process for coherent transmission by the nodes of the array.

FIG. 4 illustrates selected steps of an exemplary process 400 for communications from an array of nodes (such as the array 105) to a target (such as the target 110).

At flow point 401, the nodes are powered up and ready to operate.

In step 405, frequencies of the local clock references of all nodes of the plurality of radio frequency transmission nodes are aligned. As has already been mentioned, this may be done by using the process 300 to measure phase drifts of the nodes 105 relative to one another other. The array 105 may have a single Master node, or several Master nodes to which other nodes (Slave nodes) may synchronize. Some Master nodes may synchronize to another Master node or other Master nodes. A Slave node in one execution of the process 300 may become the Master node in another execution. Indeed, it may be that the Master node and the Slave node in one execution of the process 300, switch their respective roles in another execution of the process 300. Broadly, in the context of the process 300, the Master node is the node to which the Slave node aligns itself.

In step 410, phases of local clock references of all nodes of the plurality of radio frequency transmission nodes are aligned, using the process 300.

In step 415, time references of all the nodes are aligned.

In step 420, the data for transmission to the target is obtained at each node.

In step 425, the nodes receive a sounding signal from the target.

In step 430, each node generates a time-reversed sounding signal at carrier frequency. This is unlike TR of the process 300, in that a common phase is used at carrier frequency.

In step 435, the nodes convolve the common data with the time-reversed sounding signal, to obtain at each of the nodes its respective transmission signal.

In step 440, the nodes transmit the transmission signals synchronously so as to focus on the target in space and time.

At flow point 499, the process may end, to be repeated in part or in whole as needed.

The features described throughout this document (including those in the incorporated patent documents) may be present individually, or in any combination or permutation, except where the presence or absence of specific elements/limitations is inherently required, explicitly indicated, or otherwise made clear from the context.

Although the process steps and decisions (if decision blocks are present) may be described serially in this document, certain steps and/or decisions may be performed by same and/or separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other form of non-transitory storage medium known in the art. Exemplary storage medium or media may be coupled to one or more processors so that the one or more processors can read information from, and write information to, the storage medium or media. In an alternative, the storage medium or media may be integral to one or more processors.

This document describes in detail the inventive apparatus, methods, and articles of manufacture for synchronizing an array of nodes using Time-Reversal techniques for the internal array synchronization, including techniques for synchronizing arrays of ad hoc nodes. This was done for illustration purposes and, therefore, the foregoing description is not necessarily intended to limit the spirit and scope of the invention(s) described. Neither the specific embodiments of the invention(s) as a whole, nor those of its (or their, as the case may be) features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A method of operating radio frequency (RF) nodes, the method comprising steps of:
   emitting a first RF sounding signal by a first RF node;
   capturing a first received sounding signal resulting from the step of emitting the first RF sounding signal by the first RF node, the step of capturing the first received sounding signal being performed at a second RF node;
   downconverting the first received sounding signal to baseband or to Intermediate Frequency (IF) to obtain a first lower frequency sounding signal;
   time-reversing the first lower frequency sounding signal to obtain a first Time-Reversed(TR) lower frequency signal;
   upconverting the first TR lower frequency signal to carrier frequency using clock reference of the second RF node to obtain a first transmit signal;
   transmitting the first transmit signal by the second RF node;
   receiving a first return signal resulting from the step of transmitting the first transmit signal, by the first RF node;
   determining difference between phase of clock reference of the first RF node and phase of clock reference of the second RF node, the step of determining being based on the first return signal; and
   adjusting the phase of the clock reference of the first RF node to reduce the difference between the phase of the clock reference of the first RF node and the phase of the clock reference of the second RF node.

2. A method as in claim 1, wherein the first RF node and the second RF node are Non-Line-of-Sight (NLoS) to each other.

3. A method as in claim 1, further comprising repeating the steps of emitting, capturing, downconverting, time-reversing, upconverting, transmitting, receiving, determining, and adjusting until the phase of the clock reference phase of the first RF node differs from the phase of the clock reference of the second RF node by no more than a predetermined phase difference limit.

4. A method as in claim 3, wherein the step of downconverting the first received sounding signal comprises downconverting the first received sounding signal to IF.

5. A method as in claim 3, wherein the step of downconverting the first received sounding signal comprises downconverting the first received sounding signal to baseband.

6. A method as in claim 1, further comprising:
   emitting a third RF sounding signal by a third RF node;
   capturing a third received sounding signal resulting from the step of emitting the third RF sounding signal by the third RF node, the step of capturing the third received sounding signal being performed at the second RF node;
   downconverting the third received sounding signal to baseband or to IF to obtain a third lower frequency sounding signal;
   time-reversing the third lower frequency sounding signal to obtain a third TR lower frequency signal;
   upconverting the third TR lower frequency signal to carrier frequency using clock reference of the second RF node to obtain a third transmit signal;
   transmitting the third transmit signal by the second RF node;
   receiving a third return signal resulting from the step of transmitting the third transmit signal, by the third RF node;
   determining difference between phase of clock reference of the third RF node and the phase of the clock reference of the second RF node, the step of determining being based on the third return signal; and
   adjusting the phase of the clock reference of the third RF node to reduce the difference between the phase of the clock reference of the third RF node and the phase of the clock reference of the second RF node.

7. A method as in claim 6, wherein the first RF node, the second RF node, and the third RF node are ad hoc nodes.

8. A method as in claim 7, further comprising:
   aligning frequencies and time references of the first RF node, the second RF node, and the third RF node; and operating the first RF node, the second RF node, and the third RF node as a Time-Reversal mirror focused on one or more external targets.

9. A method as in claim 7, further comprising:
aligning frequencies and time references of the first RF node, the second RF node, and the third RF node; and
operating the first RF node, the second RF node, and the third RF node as a phased array directed towards an external target.

10. A method as in claim 7, further comprising:
aligning frequencies and time references of the first RF node, the second RF node, and the third RF node; and
step for operating the first RF node, the second RF node, and the third RF node as a Time-Reversal mirror focused on a target.

11. A method as in claim 10, wherein the steps of aligning, adjusting the clock reference phase of the first RF node, and adjusting the clock reference phase of the third RF node are performed before the first RF node, the second RF node, and the third RF node receive a sounding signal from the target, whereby the first RF node, the second RF node, and the third RF node are pre-aligned and ready to operate in a collaborative manner to focus on the target.

12. A method of operating an array of radio frequency (RF) nodes, the method comprising steps of:
step for aligning phases of clock references of the RF nodes of the array;
aligning frequencies of the clock references of the RF nodes of the array;
aligning time references of the RF nodes of the array; and
step for operating the RF nodes of the array as a Time-Reversal mirror focused on a target.

13. A system comprising:
a first Radio Frequency (RF) node comprising a first RF receiver, a first RF transmitter, a first clock reference, and a first processing element, wherein the first processing element is coupled to the first RF receiver, the first RF transmitter, and the first clock reference to control operation of the first RF receiver, the first RF transmitter, and the first clock reference; and
a second RF node comprising a second RF receiver, a second RF transmitter, a second clock reference, and a second processing element, wherein the second processing element is coupled to the second RF receiver, the second RF transmitter, and the second clock reference to control operation of the second RF receiver, the second RF transmitter, and the second clock reference;
wherein the first processing element and the second processing element are configured to cause the first RF node and the second RF node to:
emit a first RF sounding signal by the first RF node;
capture by second RF node a first received sounding signal resulting from emission of the first RF sounding signal by the first RF node;
downconvert by the second RF node the first received sounding signal to baseband or to Intermediate Frequency (IF) to obtain a first lower frequency sounding signal;
time-reverse by the second RF node the first lower frequency sounding signal to obtain a first Time-Reversed(TR) lower frequency signal;
upconvert by the second RF node the first TR lower frequency signal to carrier frequency using clock reference of the second RF node to obtain a first transmit signal; transmit the first transmit signal by the second RF node;
receive by the first RF node a first return signal resulting from transmission of the first transmit signal;
determine by the first RF node difference between phase of the first clock reference and phase of the second clock reference, based on the first return signal; and
adjust the phase of the first clock reference to reduce the difference between the phase of the first clock reference and the phase of the second clock reference.

14. A system as in claim 13, wherein the first RF node and the second RF node are Non-Line-of-Sight (NLoS) to each other.

15. A system as in claim 13, wherein the second processing element is further configured to cause the second RF node to downconvert the first received sounding signal to IF.

16. A system as in claim 13, wherein the second processing element is further configured to cause the second RF node to downconvert the first received sounding signal to baseband.

17. A system as in claim 13, further comprising:
a third RF node comprising a third RF receiver, a third RF transmitter, a third clock reference, and a third processing element, wherein the third processing element is coupled to the third RF receiver, the third RF transmitter, and the third clock reference to control operation of the third RF receiver, the third RF transmitter, and the third clock reference;
wherein the third processing element and the second processing element are configured to cause the third RF node and the second RF node to:
emit a third RF sounding signal by the third RF node;
capture by the second RF node a third received sounding signal resulting from emission of the third RF sounding signal by the third RF node;
downconvert by the second RF node the third received sounding signal to baseband or to Intermediate Frequency (IF) to obtain a third lower frequency sounding signal;
time-reverse by the second RF node the third lower frequency sounding signal to obtain a third TR lower frequency signal;
upconvert by the second RF node the third TR lower frequency signal to carrier frequency using the second clock reference to obtain a third transmit signal;
transmit the third transmit signal by the second RF node;
receive by the third RF node a third return signal resulting from transmission of the third transmit signal;
determine by the third RF node difference between phase of the third clock reference and the phase of the second clock reference, based on the third return signal; and
adjust the phase of the third clock reference to reduce the difference between the phase of the third clock reference and the phase of the second clock reference.

18. A system as in claim 17, wherein the first RF node, the second RF node, and the third RF node are ad hoc nodes.

19. A system as in claim 17, wherein the first processing element, the second processing element, and the third processing element are further configured to cause the first RF node, the second RF node, and the third RF node to:
align frequencies of the first clock reference, the second clock reference, and the third clock reference;
align time references of the first RF node, the second RF node, and the third RF node; and
operate the first RF node, the second RF node, and the third RF node as a Time-Reversal mirror focused on one or more external targets.

20. A system as in claim 17, wherein the first processing element, the second processing element, and the third processing element are further configured to cause the first RF node, the second RF node, and the third RF node to:
   align frequencies of the first clock reference, the second clock reference, and the third clock reference;
   align time references of the first RF node, the second RF node, and the third RF node; and
   operate the first RF node, the second RF node, and the third RF node as a phased array directed towards an external target.

\* \* \* \* \*

UNITED STATES PATENT AND TRADEMARK OFFICE
CERTIFICATE OF CORRECTION

PATENT NO. : 10,177,822 B2
APPLICATION NO. : 15/583896
DATED : January 8, 2019
INVENTOR(S) : David Smith et al.

It is certified that error appears in the above-identified patent and that said Letters Patent is hereby corrected as shown below:

On the Title Page

Left column, in the "Related U.S. Application Data" section, below the line that reads "(63) Continuation-in-part of application No. 14/494,580," cancel "filed on Sep. 23, 2014, now Pat. No. 1,021,659, and" and replace the cancelled text with --filed on Sep. 23, 2014, now Pat. No. 10,021,659, and--.

Signed and Sealed this
Nineteenth Day of February, 2019

Andrei Iancu
*Director of the United States Patent and Trademark Office*